E. E. GOLD.
HEATING SYSTEM.
APPLICATION FILED OCT. 22, 1909.

1,046,458.

Patented Dec. 10, 1912.
6 SHEETS—SHEET 1.

WITNESSES:

INVENTOR
Edward E. Gold,
By Attorneys,

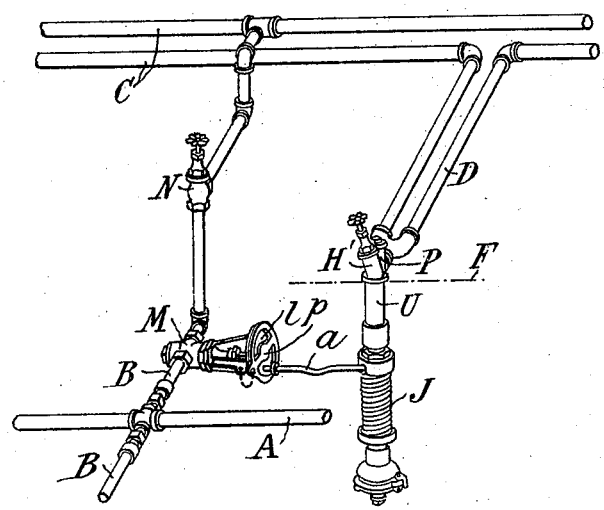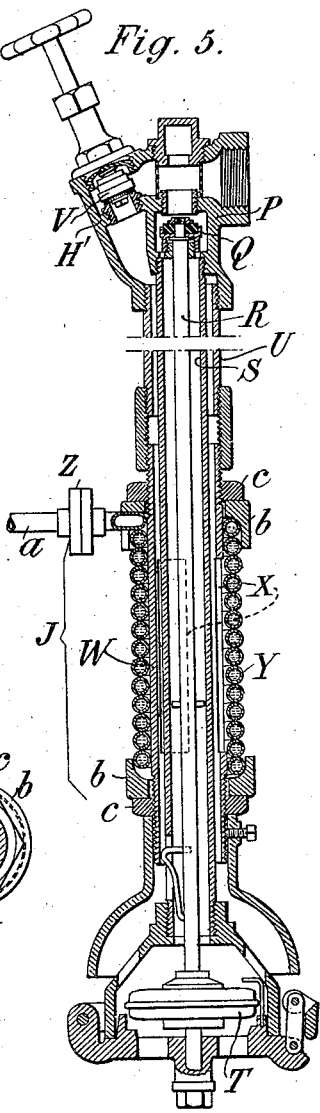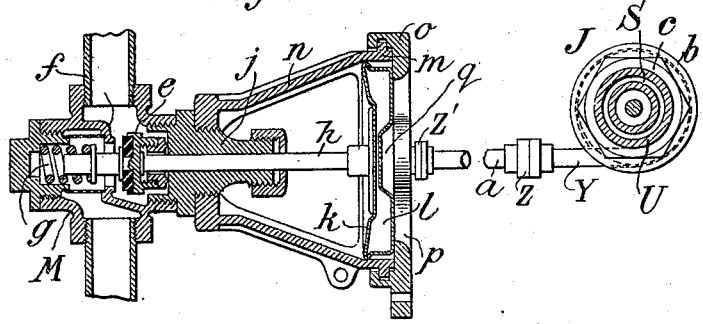

E. E. GOLD.
HEATING SYSTEM.
APPLICATION FILED OCT. 22, 1909.
1,046,458.
Patented Dec. 10, 1912.
6 SHEETS—SHEET 3.
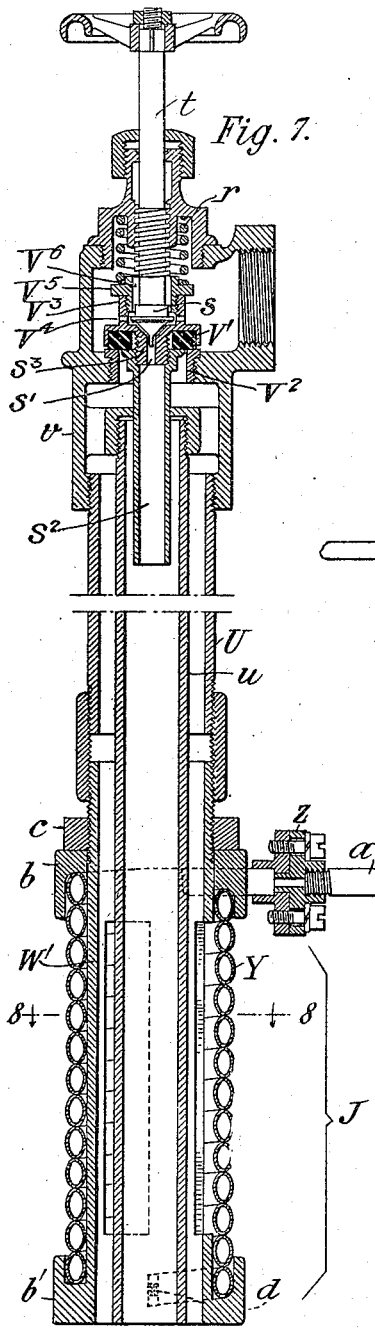
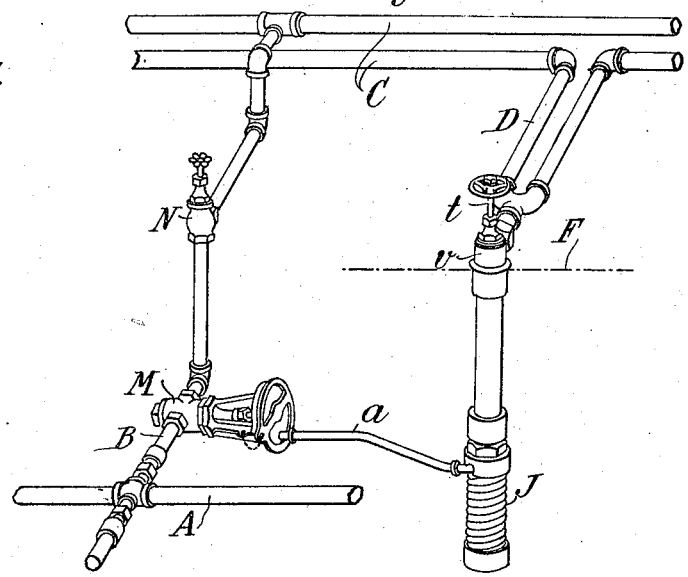
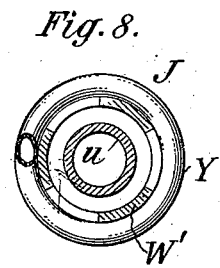
WITNESSES:
INVENTOR:
Edward E. Gold,
By Attorneys

E. E. GOLD.
HEATING SYSTEM.
APPLICATION FILED OCT. 22, 1909.

1,046,458.

Patented Dec. 10, 1912.
6 SHEETS—SHEET 4.

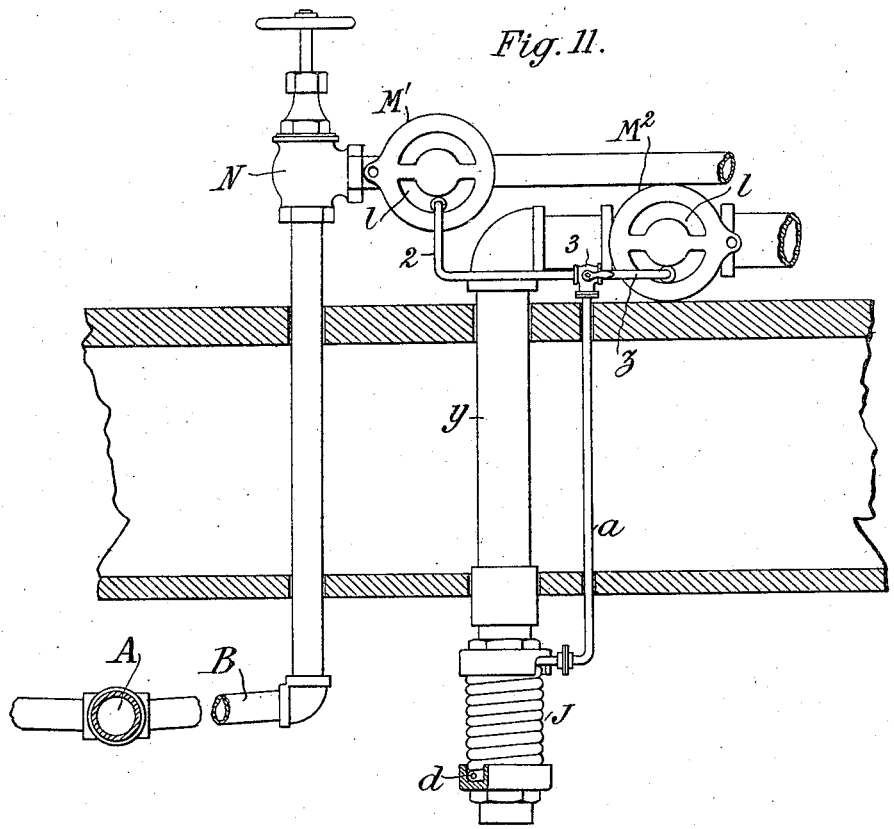
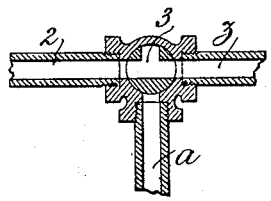 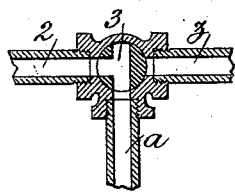 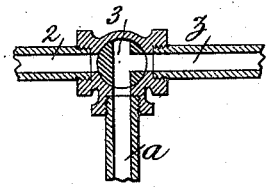

E. E. GOLD.
HEATING SYSTEM.
APPLICATION FILED OCT. 22, 1909.
1,046,458.
Patented Dec. 10, 1912.
6 SHEETS—SHEET 6.
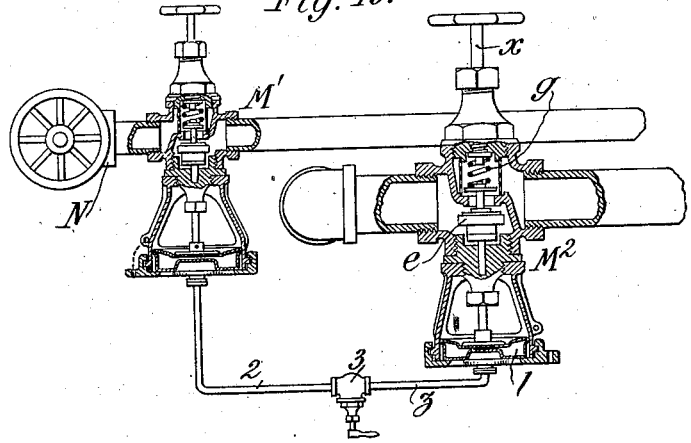
INVENTOR:
Edward E. Gold,
By Attorneys,
WITNESSES:

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

HEATING SYSTEM.

1,046,458.  Specification of Letters Patent.  Patented Dec. 10, 1912.

Application filed October 22, 1909. Serial No. 523,997.

*To all whom it may concern:*

Be it known that I, EDWARD E. GOLD, a citizen of the United States, residing in the borough of Manhattan, city, county, and State of New York, have invented certain new and useful Improvements in Heating Systems, of which the following is a specification.

In my application for patent for an improvement in heating systems, No. 463,109 (Patent No. 985,410, dated February 28, 1911), I have described certain heating systems especially applicable to the heating of railway cars by steam or indirectly by hot water, and a thermostatic mechanism for controlling the same comprising an expansible vessel removed from the zone in which the heat sensitive medium is located, and a vessel carrying a heat sensitive or thermostatic fluid exposed to the controlling temperatures in a peculiarly advantageous manner. The present application is based principally on matter carved out of the aforesaid application, including a system in which I employ the improved thermostatic mechanism of said application and certain other features which are referred to in detail hereinafter. In a still earlier application, No. 455,470, I have described and claimed broadly a system utilizing a thermostatic mechanism of the same general class, and the present application covers specifically certain apparatus coming within the terms of said broad claims. Other apparatus and parts of the complete system are included in other divisional applications.

The accompanying drawings illustrate apparatus embodying the invention.

Figure 1:
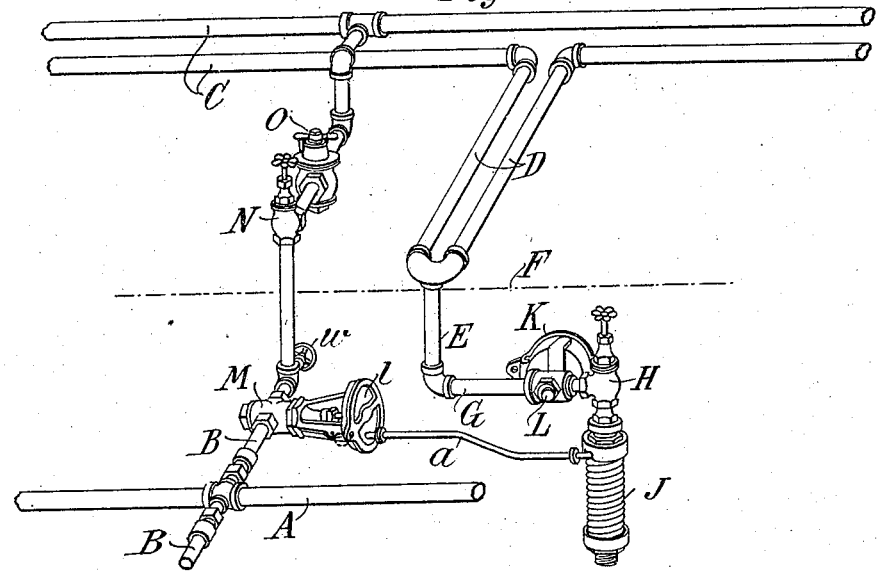
Figure 2:
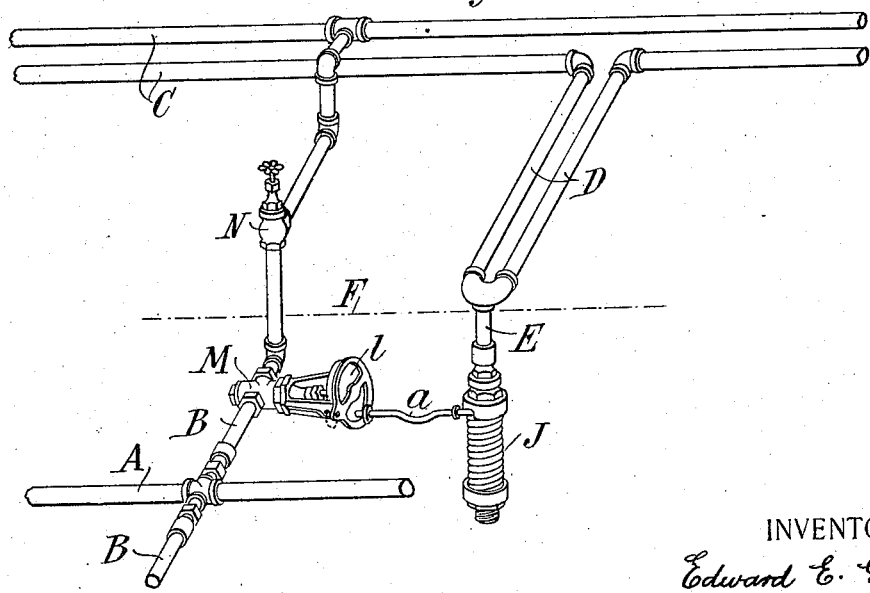
Figure 9:
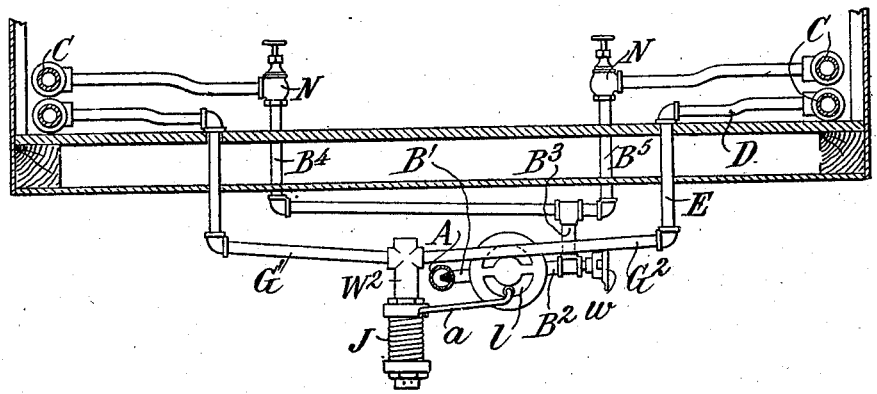
Figure 10:
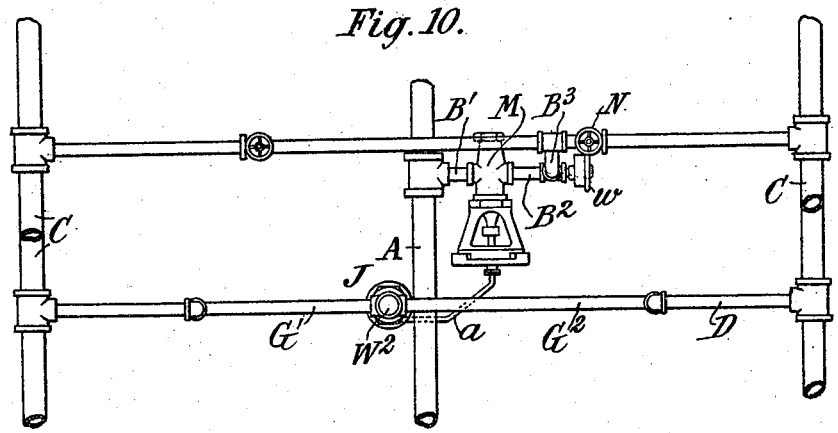

Figure 1 is a perspective view of an interchangeable system,—that is to say, one operable at supply-pipe pressure or at approximately atmospheric pressure, at will. Fig. 2 is a similar view of an atmospheric pressure system. Fig. 3 is a similar view of another interchangeable system. Fig. 4 is a horizontal section through the admission valve and the discharge pipe of Fig. 3. Fig. 5 is a vertical section through the said discharge pipe. Fig. 6 is a perspective view of another style of interchangeable system. Fig. 7 is a vertical section through the discharge pipe thereof. Fig. 8 is a horizontal section on the line 8—8 of Fig. 7. Figs. 9 and 10 are respectively a vertical cross-section and a partial plan of a multiple radiator vapor system. Fig. 11 is a vertical cross-section of part of another system showing the admission and discharge pipes for an interchangeable system. Figs. 12, 13 and 14 are vertical sections of a valve of the system shown in Fig. 11. Fig. 15 is a horizontal section of the automatic valves of Fig. 11 with adjacent parts in plan.

Referring to the embodiments of the invention illustrated, the usual train-pipe A carries a pressure of steam reduced from that in the locomotive boiler and varying from 40 to 80 pounds generally, and extends the length of the car. It is provided under each car with suitable branches B leading to the radiating systems on opposite sides of the car. The radiating pipes are represented at C. Steam passes therefrom through branches to a vertical discharge pipe E passing through the floor of the car, the level of the latter being indicated by the dotted line F. In the ordinary systems in which steam is employed under pressure the admission valve stands continually wide open and the discharge end of the radiating system is closed by a trap containing a valve which opens at intervals to permit the discharge of the water of condensation and then closes again to retain the pressure. In the so-called vapor systems operating approximately at or below atmospheric pressure, the discharge is open and the admission valve is controlled in accordance with the quantity of steam desired, either by maintaining it only partially open or by alternately opening and closing it. The apparatus of Fig. 1 is designed to secure, at will, either one or the other of these operations, that is to say, it is interchangeable from a pressure system to a vapor system and vice versa. The discharge from the vertical branch E passes through a downwardly inclined pipe G, at the lower end of which is a hand valve H of the common blow-off type, to the lower part of which is attached a thermostat J hereinafter referred to in detail. Branching from the pipe G in advance of the blow-off valve H is a trap K of a known type which operates as above described to stand normally closed and to open at intervals to permit the discharge of the water of condensation. At the opposite side of the pipe G is located a pressure valve L of a common Gold type adapted when the pressure in the system falls nearly to zero, to open and permit the escape of any water and to admit air in case of a vacuum. An automatic admission valve M is located in the branch B closely adjacent to the thermostat J and is under control thereof. Within the car is a hand-admission valve N and a pressure-reducing valve O whereby when operating as a pressure system any desired pressure may be used up to the limit determined by the pressure in the train-pipe. Supposing the hand valve N open, the train-man will control the operation of the system by merely opening and closing the hand blow-off valve H. When this valve is closed the discharge must take place through the trap K and the system will operate as a pressure system of the ordinary type. When the blow-off valve H is open a free exit is provided continuously for the steam and water of condensation and no pressure can accumulate. All or the greater part of the steam and water will escape through the blow-off, and the thermostat is designed to use the heat of the heating medium passing therethrough for closing the automatic admission valve M so as to limit the admission of steam in accordance with its consumption in the radiating pipes.

In the system shown in Fig. 2 there is no trap. The steam and hot water from the radiating system pass out through the branches D, and the vertical discharge pipe E through the thermostat J, so that the automatic admission valve M is always under control from the heating medium. This is a simple vapor system.

Figs. 3, 4 and 5 illustrate an interchangeable system operating in substantially the same way as that of Fig. 1; the principal differences being in the location and construction of the trap and thermostat at the end of the system. The steam from the branches D of the radiating system passes over a discharge valve P automatically operated so as to form a trap for the water of condensation when the system operates under pressure, and thence to a blow-off valve H' located just beyond the trap valve in the same fitting. The trap and the combined blow-off and thermostat are arranged concentrically with the latter surrounding the former. The valve body of the trap is indicated at Q and is mounted at the upper end of a valve rod R running down through the vertical pipe S of the trap to a vessel T at the bottom carrying a thermostatic liquid which is expansible vertically when the liquid is vaporized by the heat of the escaping heating medium. The outer pipe U surrounding the trap pipe is the blow-off pipe and communicates at its upper end with a hand valve, the body of which is indicated at V. The lower end of the blow-off pipe is coupled to a support W in the form of a pipe with openings X through its sides through which the steam and hot water can come into direct contact with the convolutions of a spiral or helicoidal pipe Y located upon the outside of the supporting pipe W; the latter being coupled to the discharge pipe U from the blow-off valve. The arrangement will be understood more readily from Fig. 8. The thermostatic mechanism which is used for controlling the admission valve (and also the discharge valve in some of the constructions hereinafter referred to) is divided into two principal parts, one carrying out the expanding function and which I term generally the expansible member, and the other constituting the thermostatic member in which the heat sensitive medium is exposed to the heating medium. The coil Y for example, in the combinations shown constitutes the thermostatic member. It is made up of copper or brass tubing, the lower end being sealed and the upper end being connected by a tight joint Z to a small flexible pipe $a$ by which the pressure generated in the thermostatic medium is communicated to the expansible vessel. The coil is supported about the supporting tube W by means of cup-shaped washers $b$, and nuts $c$ near the opposite ends of the supporting pipe W. The nuts $c$ may be adjusted so as to hold the convolutions of the coil in contact with each other and prevent the passage of steam or of air between them, or these nuts may set the coil with greater or smaller passages between the convolutions. The cold air is blowing on the coil at all times that the train is running, and the effect of separating the convolutions would be to expose the coil more extensively to the cooling action of the air and to render the system more sensitive to the coldness of the outer air. The use of a coil of pipe as the vessel for carrying the thermostatic fluid and exposing it to the heat and cold has great advantages, especially in that it expands and contracts freely and can be made free from joints except the single joint which connects it with the expansible vessel adjacent to the valve, in that it exposes a large surface to the steam at one side and to the air at the other side, and in that it can be readily and cheaply applied to traps or heating systems already in use. To permit the escape of air from the coil Y while filling it a small orifice is left at the bottom which when the necessary quantity of the thermostatic liquid is introduced, is closed by a plug $d$, Figs. 7 and 11 which is sufficiently tight to permit the coil to be soldered so as to close the opening hermetically.

It has always been a difficult matter to provide for the proper ventilation or exposure to the atmosphere of the vessel carrying the thermostatic liquid. In practically all the traps employed in car heating this vessel has been inclosed (like the vessel T, Fig. 5), and efforts have been made to secure as full an exposure to the atmosphere as possible. With the present system and especially with the coiled pipe serving as the vessel for carrying the thermostatic liquid, there is a perfect exposure to the atmosphere. This is of importance in determining the sensitiveness of the system. For theoretical perfection the system should operate so sensitively as to maintain as nearly as possible the same temperature at the discharge end of the radiator as at its admission end, thus getting the greatest efficiency out of the piping whose radiating surface is designed for a standard temperature. With a thermostat of the kind shown in Fig. 1, I have succeeded in securing, without appreciable waste of steam and working at atmospheric pressure, a temperature at the discharge end of the radiator approximately 12 per cent. greater (above zero Fahrenheit) than can be secured under the same conditions with the best traps of the type in which the thermostat is inclosed. Also the large exposure to the air accomplishes a very perfect regulation of the heating of the car; the rapidity with which the valve is opened and shut varying widely under different atmospheric temperatures. The coiled pipe or vessel carrying the volatile liquid is not separately claimed in the present application, being claimed in another application, (No. 523,998).

The admission valve designated as a whole by the letter M is shown in detail in Fig. 4. The valve body $e$ is pressed away from the seat $f$ by means of a spring $g$ engaging the inner end of the valve stem. The stem $h$ passes through a stuffing-box $j$ to the inner movable face $k$ of the expansible vessel $l$ which is connected by a joint $Z'$ to the pipe $a$ communicating with the coil Y. The expansible vessel is held within a ring $m$ supported by a spider $n$ extending from the stuffing-box; and is clamped in place by a ring $o$ making a bayonet joint connection with the ring $m$. The outer ring $o$ has a cross-bar $p$ serving to hold the outer wall of the expansible vessel rigid, and the outer wall of the vessel has a depression $q$ at its center for limiting the inward movement of the inner wall $k$.

The system of Figs. 6, 7 and 8 is similar to that of Figs. 3, 4 and 5 except that for the trap there is substituted a drip mechanism. The main valve for the discharge of steam or water of condensation is $V'$, and it rests upon a seat $V^2$ in the casing $v$ to which the pipe U is attached. The valve $V'$ is provided with a passage $s'$ through its center leading to a drip tube $s^2$, all of which parts move with the valve, and has a seat $s^3$ upon which the drip valve $s$ closes by screwing its stem $t$ in and out. The valve $V'$ has a cylindrical extension $V^3$ provided with openings $V^4$ for the passage of water therethrough, and provided at its upper end with a shoulder or rim $V^5$ which is engaged by a spring $r$ and pressed downward to force the valve $V'$ always toward its seat. The shoulder or rim $V^5$ is a flange on an inner tubular member $V^6$, the lower edge of which constitutes an inner shoulder adapted to be engaged by a flange on the drip valve $s$ when the latter is raised. With this mechanism a small outlet $s'$ to the drip tube $s^2$ may be left open through which the water of condensation may drip at substantially the same rate as that at which it is formed in the radiating pipes, the outlet being so small as to hold back the steam and maintain the desired pressure; thus insuring an approximately continuous purging of the water of condensation as distinguished from the intermittent purging action of the ordinary trap. The blow-off valve $V'$ is normally pressed to its seat by means of the spring $r$. When the handle is turned slightly to lift the drip valve off its seat there is a slow escape of water of condensation, and the maintenance of the pressure of steam in the radiating pipes. When the handle is turned farther the blow-off valve $V'$ is lifted from its seat and the steam escapes rapidly and down through the outer blow-off pipe U and its extension surrounded by the coil Y connected to the admission valve through the connecting pipe $a$. The discharge from the drip is through the inner pipe $u$ screwing at its upper end into a ring cast within the casing $v$ of the valves and extending the full length of the outer pipe and the tubular support $W'$ is preferably of malleable cast iron with a flange $b'$ at its lower end cast integrally thereon and provided with a groove so as to correspond with the adjustable cup-shaped washer $b$ at its upper end.

The device of Fig. 7 is separately claimed in my application No. 562,397.

The principles of the previously-described systems may be applied with advantage to two or more radiators in a car, using a single thermostatic mechanism for all the radiators. Such a system is shown in Figs. 9 and 10. The train-pipe A carries steam through a strainer to a branch B', whence it passes through an automatic admission valve M to a short, approximately horizontal pipe $B^2$ and a vertical pipe $B^3$, whence run the upward branches $B^4$, $B^5$ to the two different radiators or systems of radiating pipes C at opposite sides of the car; the usual intermediate stop valves N being preferably provided at the top of the vertical pipes $B^4$ and $B^5$. The discharge pipes D from the radiators pass by way of vertical pipes E to inclined pipes $G'$ $G^2$ and thence to a vertical tubular support $W^2$ upon which is carried the coil J containing the volatile medium connected by means of a pipe $a$ with the expansible vessel $l$ of the admission valve. There is practically no inter-communication between the radiating systems from their inlets to the thermostat at their outlets, which might cause the sucking up of steam from the discharge at one radiator into the radiating pipes of another when the latter is suddenly cooled and a vacuum formed therein, or when the former is subjected to a sudden excess of pressure. The absence of any common main, and the carrying of the heating medium from each radiator independently practically to the point of discharge, avoids any interference and is particularly advantageous in connection with a vapor system such as is illustrated. As a security against the accumulation of water in the piping between the automatic admission valve M and the stop valves N, there is introduced, at a point near the lower end of this piping, a small steam trap $w$ of any suitable design and which permits of the escape of water of condensation when the latter accumulates, but closes as soon as the steam commences to escape therethrough. Such a trap $w$ is of advantage whether the automatic admission valve M be arranged to supply steam to both sides of the car, or to one side only, and whether the system be a vapor system or an interchangeable system. For example, it may be used in connection with the system of Fig. 1 as shown, where both an admission and a discharge valve are thermostatically controlled, the automatic admisssion valve being at a point below the piping within the car. It is especially useful, however, in atmospheric pressure systems since in these there is a tendency of the water of condensation to flow back toward the admission valve in the portion of the piping above referred to, and to obstruct and perhaps by freezing prevent the proper operation of the system. The trap may be connected to the angle between the pipes $B^2$ and $B^3$ by means of a nipple and strainer in order to keep its seat clean.

Figs. 11 and 15 illustrate an interchangeable system in which an automatic admission valve and an automatic discharge or trap valve, both within the car, are controlled by the temperature at the discharge end of the system. The automatic fluid pressure-actuated valves M' and $M^2$ are similar to that shown in Fig. 4 with the addition of a hand-actuated stem $x$ by which the strength of the spring $g$ may be regulated in each of the two valves and which when it is screwed far into the valve casing, will come into contact with the inner end of the stem of the valve $e$ so as to hold this normally automatic valve positively open. The thermostat J carried at the end of the vertical discharge pipe $y$, is connected by means of a connecting tube $a$ to a similar small tube having a pair of branches $z$ and 2 communicating respectively with the expansible vessels $l$ of the discharge and admission valves $M^2$ and M'. A hand-operated three-way valve 3 puts the main pressure tube $a$ into communication with either, both or neither of the valves M', $M^2$ of the heating system. The style of valve shown in Fig. 15 may be used with any of the other systems shown, but is especially applicable to the system shown in Figs. 11 to 15. The hand-operated stems $x$ may be used to set the springs of the valve to determinable resistances to oppose the movement of the valves by the expansible vessels, and are in that respect equivalent to the adjusting stems of ordinary pressure-regulating valves, and they may be provided or not with indicators to show the amount of pressure to which the valves are set; that is to say, the amount of pressure which is required to close each of the valves. The pressure in this case is the pressure of the thermostatic fluid and not that of the heating medium. It is not therefore so important to determine exactly the pressure to which each valve is set. The important thing is to be able to set the different valves for different opening pressures so that one may be set to operate before the other, and the two valves may be set at such relative positions as to change the system from a pressure system to a vapor system. The three-way valve 3 might be used for the same purpose, but preferably the two mechanisms are provided together in the same system. If the adjusting stems be set so that the admission valve will operate at a lower pressure than the discharge valve, the first effect of escaping steam would be to close the admission valve; whereupon there would be little or no increase of pressure in the thermostatic fluid, and the discharge valve would remain open, the admission valve opening and closing as the rapidity of condensation requires (or assuming an intermediate position, balancing the admission and condensation). If, on the other hand, the discharge valve is set to operate at the lower temperature pressure, then as steam passes through the system the discharge valve will close and will cut off the discharge before the pressure in the thermostatic fluid increases sufficiently to close the admission valve, and the system will operate as an ordinary pressure system. Or the two adjusting stems $x$ might be so set as to provide only a slight difference in the pressures necessary to operate the two valves, so that the passage of steam through the discharge pipe would affect the operation of both valves; the admission or the discharge valve, as desired, being arranged to operate slightly in advance of the other. The above-described operations assume that the three-way valve 3 is turned to the position for admitting pressure to both the automatic valves. By suitably manipulating the three-way valve, both the automatic valves may be cut off from the pressure so that they will both stand open, as is necessary, for example, in blowing out the system. Fig. 12 shows this position. By turning the three-way valve to the position of Fig. 13 or to that of Fig. 14 the admission valve or the discharge valve respectively, would be alone controlled by the thermostatic mechanism and its sensitiveness would be adjusted by the stem $x$ thereof.

While it is possible to use other styles of thermostat the coil illustrated in the previous figures is especially useful in steam heating systems for railway cars in the readiness with which it can be applied to the usual discharge pipe extending under the floor of the car, in the extreme sensitiveness due to its wide exposure to the wind caused by the movement of the car, in its elasticity and jointless construction, which enables it to withstand the hard usage of train service perfectly, and in the ease with which it may be brought into communication with one or more valves to be controlled at a distance, which valves are generally located above the discharge end of the system. Thus the expansible vessels may contain air or vapor only, the whole body of liquid which is to be vaporized being located immediately at the point where the heat is applied; the vapor which passes into the expansible vessels and connecting tubes running back by gravity into the column when it is condensed. These and other features of convenience, cheapness and reliability make this coil an element of special value in combination with a car heating system.

The combining of two or more radiators upon a single admission valve, as in Figs. 9 and 10, may be practised with the several arrangements and details of thermostat and automatic valves disclosed in the other figures of the drawing.

What I claim is:—

1. A car heating system having a radiator within the car and discharging outside of the car, said system having a valve controlling the flow of steam through said radiator, and thermostatic means for controlling said valve including a coil of pipe surrounding the discharge and carrying a thermostatic fluid and exposed to the outside air and to the heat from the escaping heating medium.

2. A heating system including a fluid pressure-controlled admission valve, a fluid pressure-controlled discharge valve, a single thermostatic means for generating fluid pressure, means for applying said fluid pressure to both of said valves, springs in said valves acting against said fluid pressures, and means for adjusting the strengths of said springs separately for given positions of the valves to insure the operation of either at will at a lower fluid pressure than the other.

3. A heating system including fluid pressure-actuated discharge and admission valves, a single thermostatic means for generating fluid pressure, means for applying said fluid pressure to both of said valves to close them, and manually-controlled means for holding said valves open separately.

4. A heating system including a discharge valve, and an admission valve, separate expansible vessels controlling the respective valves, a thermostatic liquid-containing vessel in communication with said expansible vessels for introducing fluid pressure thereinto to expand them, and means for cutting off said communication with one or the other of said expansible vessels at will to prevent the introduction of such fluid pressure thereinto.

5. A heating system including a discharge valve, and an admission valve, separate expansible vessels controlling the respective valves, a thermostatic liquid-containing vessel in communication with said expansible vessels for introducing fluid pressure thereinto to expand them, and manually-controlled means for holding said valves open separately.

In witness whereof, I have hereunto signed my name in the presence of two subscribing witnesses.

EDWARD E. GOLD.

Witnesses:
D. ANTHONY USINA,
THOMAS F. WALLACE.